Aug. 23, 1966 K. EHRAT 3,268,163

PERFORATOR FOR PUNCHING INTO TAPES AND THE LIKE HOLE COMBINATIONS CORRESPONDING TO INFORMATION-BEARING SIGNALS

Filed Oct. 5, 1964 3 Sheets-Sheet 1

INVENTOR
KURT EHRAT,

BY Pierce, Scheffler & Parker
ATTORNEYS

Aug. 23, 1966 K. EHRAT 3,268,163

PERFORATOR FOR PUNCHING INTO TAPES AND THE LIKE
HOLE COMBINATIONS CORRESPONDING TO
INFORMATION-BEARING SIGNALS

Filed Oct. 5, 1964 3 Sheets-Sheet 2

INVENTOR
KURT EHRAT,

BY Pierce, Scheffler & Parker
ATTORNEYS

Aug. 23, 1966 K. EHRAT 3,268,163

PERFORATOR FOR PUNCHING INTO TAPES AND THE LIKE HOLE COMBINATIONS CORRESPONDING TO INFORMATION-BEARING SIGNALS

Filed Oct. 5, 1964 3 Sheets-Sheet 3

Inventor

Kurt Ehrat

By Pierce, Scheffler & Parker

Attorneys

United States Patent Office 3,268,163

Patented August 23, 1966

3,268,163

PERFORATOR FOR PUNCHING INTO TAPES AND THE LIKE HOLE COMBINATIONS CORRESPONDING TO INFORMATION-BEARING SIGNALS

Kurt Ehrat, Zurich, Switzerland, assignor to Gretag Aktiengesellschaft, Regensdorf, Switzerland Filed Oct. 5, 1964, Ser. No. 401,446
Claims priority, application Switzerland, Oct. 15, 1963, 12,699/63
8 Claims. (Cl. 234—42)

Figures 1, 1A:
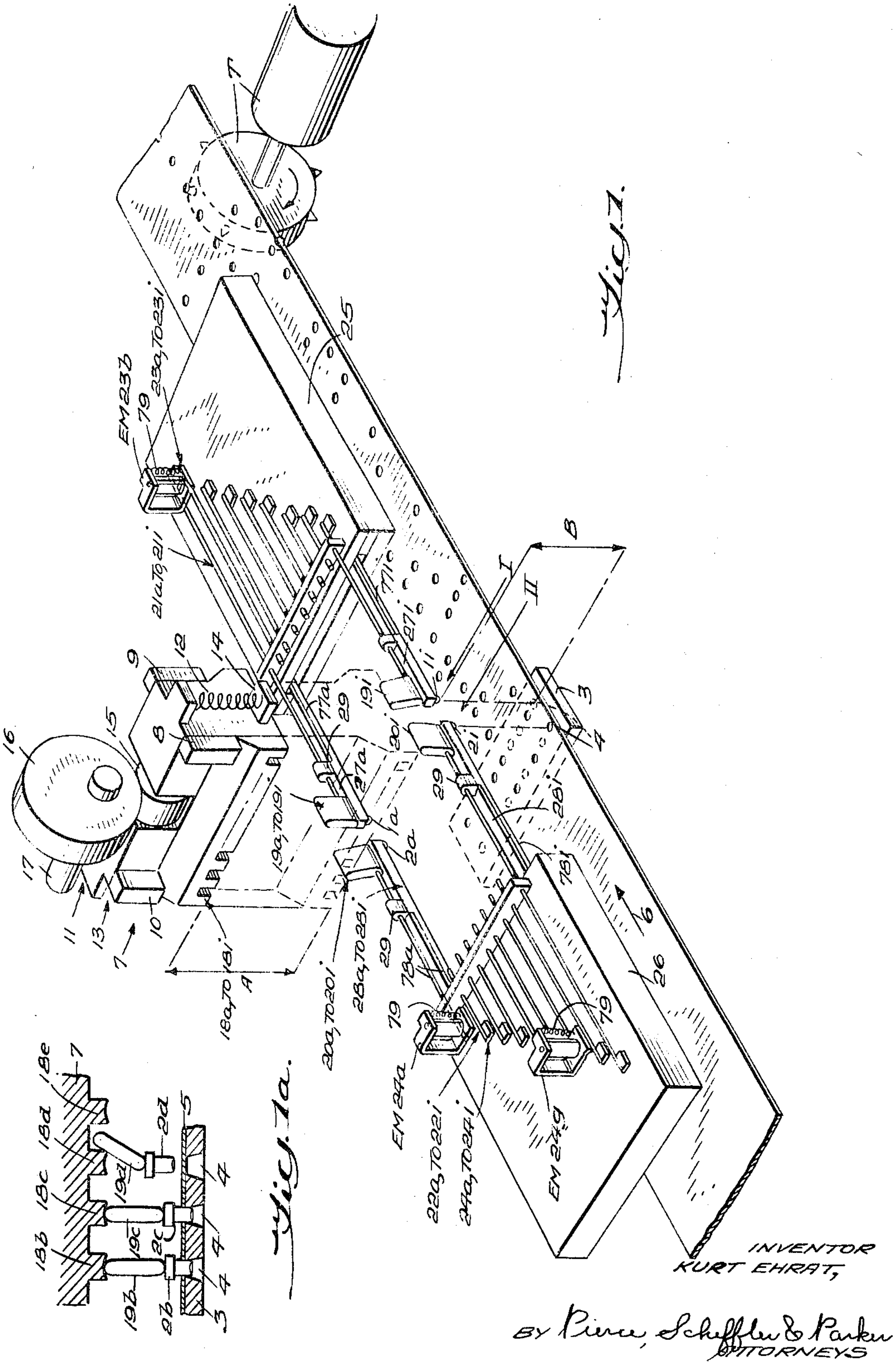

This invention relates to devices, commonly termed "perforators" for punching into tapes, punch cards and the like consecutive hole combinations corresponding to consecutive information-bearing signals, the tapes, punch cards and the like being used as information carriers, for example, in teleprinter engineering and machine tool control. Unless the context otherwise requires, the term "tape" will hereinafter be used to include punch cards and the like as well as tapes.

In one type of known perforator, one punch is provided for each of the information hole tracks on the tape and for each feed hole track if provided, and these punches are arranged in a row transversely to the direction of the hole tracks and consequently also transversely to the direction of travel of the tape through the perforator. The punches in such a row are selected for punching in accordance with an incoming information-bearing signal by means of electromagnets, and the selected punches are actuated in a common work phase i.e. simultaneously, to produce a hole combination corresponding to the signal. A hole combination comprises generally a feed hole and a selection from the maximum possible number of information holes, and constitutes a row of holes transversely to the direction of travel of the tape. In the case of a tape having one feed hole track and 5 information hole tracks, six punches are required in the row, and $2^5$ i.e. 32 different hole combinations are possible. Each hole combination may denote a specific symbol, for example a letter or a number. In the case of a tape with 8 information tracks and 1 feed hole track nine punches are required and $2^8$ i.e. 256 different hole combinations are possible.

As will be appreciated, each information-bearing signal causing selection of a combination of punches consists of a set of control instructions.

In these perforators, the tape is advanced by one hole division, after each hole combination has been punched and a new hole combination is then selected and punched. Consequently one hole combination after another is punched consecutively. Usually each punching cycle involves movement of a number of parts of the perforator, for example parts controlling the selection of punches, subsequent actuation of the selected punches, and feed of the tape, and the higher the punching speed, the more rapidly must all these movements be performed, and the greater are the acceleration forces. Consequently any increase in the punching speed is limited by the acceleration forces which increase with the speed. Since these acceleration forces increase as the square of the punching speed, it has been found to be difficult to increase the punching speed beyond approximately 50 to 100 hole combinations per second, with the tape perforators of known construction. At higher punching speeds the wear and the noise caused by the high acceleration forces, increase markedly, and also the tape perforators become extremely expensive to construct. It is an object of the invention to provide a perforator through which can be passed a tape at a speed approximately twice that of known perforators for approximately equal acceleration forces.

The perforator in accordance with the invention comprises first and second parallel rows of punches spaced apart a predetermined distance and disposed transversely to the direction of travel of a tape through the perforator, selection means for selecting for actuation a combination of the punches in the first and second rows in response to a first and second information-bearing signal respectively, actuating means for simultaneously actuating the selected punches in both rows, and means for advancing to the punches a length of tape equal to twice the distance apart of the rows of punches.

In a preferred embodiment of the invention the selection means comprises drivers, one for each of the punches, movable in response to an information-bearing signal from a non-punching position to a punching position for co-operating with the actuating means, which preferably is an actuator common to both rows, to cause a hole to be punched. The drivers are mounted on rotatable shafts each connected to an electromagnetic device actuable in response to an information-bearing signal to rotate the shaft in a predetermined direction to move the driver to its punching position.

Figure 2:
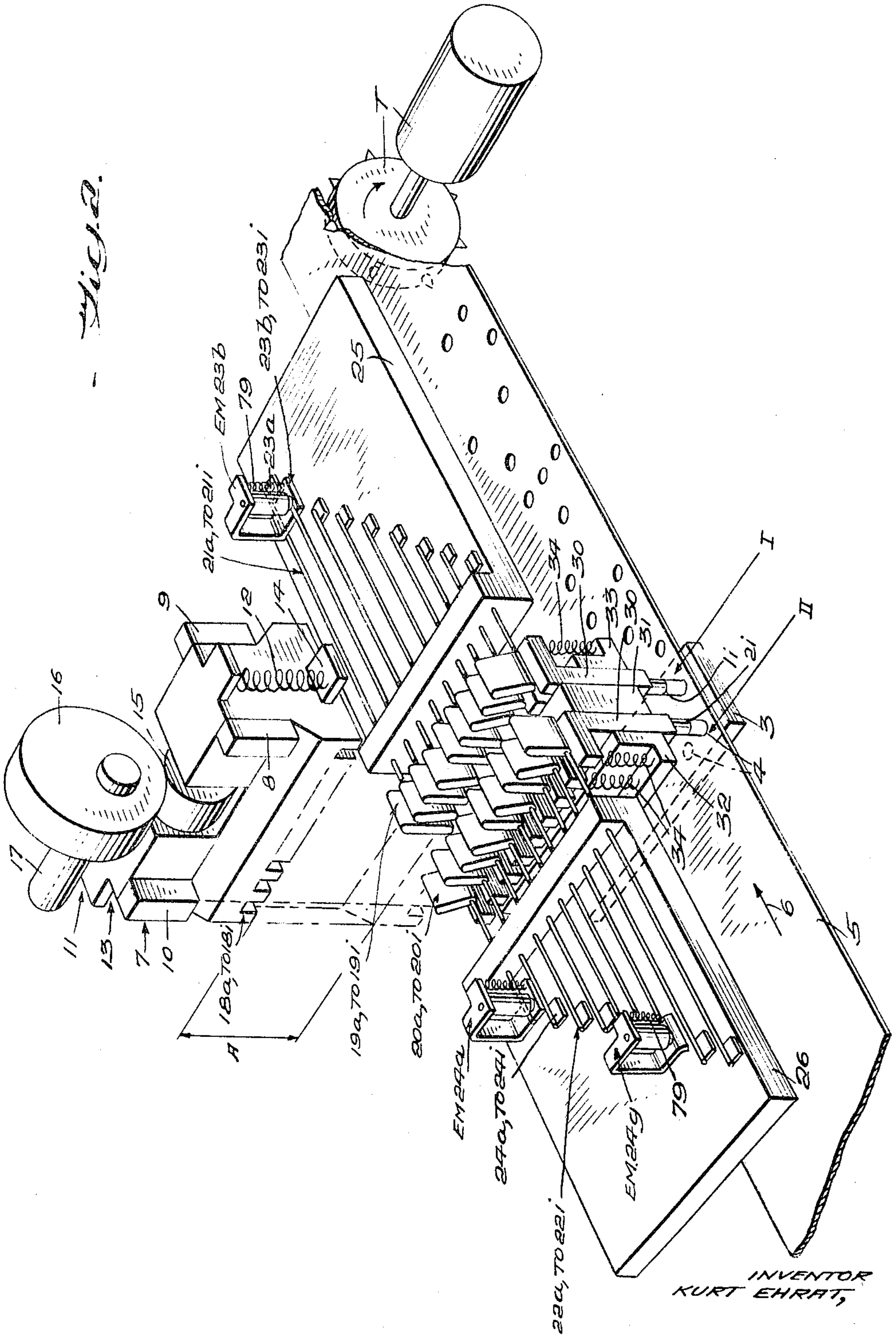
Figure 3:
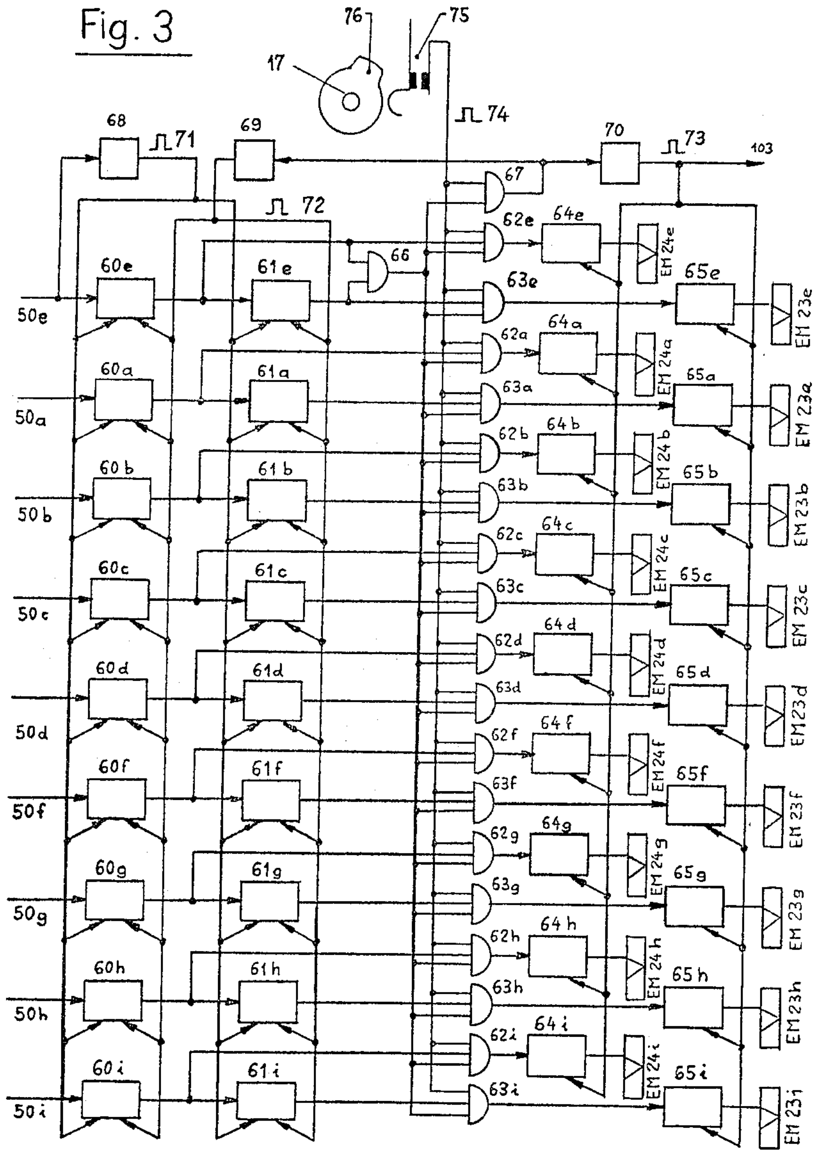

Two examples of a perforator in accordance with the invention will now be described with reference to the accompanying drawings, in which:

FIGURE 1 is a perspective, diagrammatic view of one of the examples in accordance with the invention;

FIGURE 1*a* illustrates a detail of the perforator shown in FIGURE 1;

FIGURE 2 is a view similar to FIGURE 1 of the second of the examples to be described; and FIGURE 3 shows a circuit for controlling the perforators shown in FIGURES 1 and 2. In FIGS. 1 and 2, are shown perforators each having two rows of punches, designated I and II respectively, each containing nine punches, namely eight information hole punches and one transport hole punch. For the sake of clarity in FIG. 1, only the two extreme punches 1*a*, 1*i* or 2*a*, 2*i* are shown in each row. Only the punches 1*i* and 2*i* are visible in FIG. 2.

Beneath the two rows of punches I and II, there is arranged a dieplate 3 which has, opposite each punch, a downwardly enlarged hole 4 (see FIGURE 1*a*). The tape required to be perforated is designated 5 and in operation of the perforator is drawn step by step across the dieplate in the direction of the arrow 6 by means of a transport device T. Since, according to the invention, two hole combinations (rows I and II) are punched in each cycle it is necessary for the perforated tape to be transported by 2 hole divisions *t* after each cycle.

Above the rows of punches I and II there is arranged an actuator common to both rows in the form of a punching block 7 which is supported by means of bars 8, 9, 10 and 11 (concealed) and compression springs 12 and 13 (concealed) in the machine frame, of which only the point of support 14 for the spring 12 is illustrated. The remaining parts of the machine frame are omitted, in order that important parts of the apparatus shall not be concealed. The punching block 7 carries a roller 15 at the top. The force of the compression springs 12 and 13 urges the punching block 7 upwardly, so that its roller 15 is urged against the periphery of an eccentric disc 16. This eccentric disc is drivably via a shaft 17, so that the punching block 7 reciprocates by the co-operation of the eccentric drive and the compression springs. The position of the eccentric disc 16 illustrated in FIGS. 1 and 2 is such that the punching block 7 occupies the top limit or non-actuating position, whereas the punching block 7 is illustrated in the bottom limit position or actuating position in FIG. 1*a*.

The punching block 7 has a lower surface which is recessed to provide projections or cams 18*a* to 18*i*, one for each punch in a row. Between these cams and the punches are arranged generally flat rectangular drivers 19*a* to 19*i* and 20*a* to 20*i* for rows I and II respectively. Each of these drivers is movable into two different positions by means of an associated electromagnet, so that in one position, its punching position, its opposed lateral edges are vertical and are aligned with the associated cams 18*a* to 18*i*, and in the other position its opposed lateral edges are inclined to the vertical at an acute angle and are aligned with the recesses between the cams.

The drivers 19*a* to 19*i*, and 20*a* to 20*i* provide means for selecting for actuation the punches in the rows I and II in response to a first and second information-bearing signal respectively, by movement of a selection of the drivers from their inclined or non-punching positions to their vertical or punching positions. This movement is effected by rotary flexible control shafts 21*a* to 21*i* and 22*a* to 22*i* for the drivers 19*a* to 19*i* and 20*a* to 20*i* respectively, connected to the armatures of electromagnets 23*a* to 23*i* and 24*a* to 24*i* mounted in lug-like manner each at one end of a control shaft to the other end of which a driver is mounted. The armatures are restored by compression springs 79. The electromagnets and control shafts with their drivers and magnet armatures are assembled into two groups correspondingly to their association with the two rows of punches I and II, each of these groups being mounted on a common support 25 or 26, on either side of the rows of punches above the tape 5. The control shafts are oriented parallel to the direction of the tape.

In their non-punching positions, in which the drivers are positioned slightly obliquely and are aligned with the grooves between the cams 18*a* to 18*i*, they are not entrained by the punching block and no perforation of the tape occurs. The punching and non-punching positions of the drivers are illustrated in the case of three punches in FIG. 1*a*. In the movement phase illustrated in this figure, the punching block 7, via the vertically positioned driver bodies 19*b*, 19*c*, forces the punches 2*b*, 2*c* through the tape 5 into the holes 4 of the dieplate 3. The actuation of the punch 2*d* is inhibited by the inclined position of the deflected driver body 19*d*.

In order to prevent important parts of the perforator being concealed in the drawing, the interval between the punching block and the drivers is shown exaggerated in FIGS. 1 and 2. The correct position is indicated by the contours of the punching block 7 shown by dash-lines. From the same considerations of draftsmanship, the interval between the punches and the tape is shown enlarged in FIG. 1.

The embodiments illustrated in FIGS. 1 and 2 differ from one another solely by a different guide system for the punches.

According to FIG. 1, the punches 1*a* to 1*i* and 2*a* to 2*i* are mounted on punch supports 27*a* to 27*i* and 28*a* to 28*i*, and the latter are mounted at the free ends of resilient tongues 77*a* to 77*i* and 78*a* to 78*i*. These resilient tongues consist of two spaced leaf springs which are firmly clamped at one end to the support 25 or 26 and at the other end to the punch support 27*a* to 27*i* or 28*a* to 28*i*, and are oriented approximately parallel to the plane of the perforated tape in such a way that the punches are guided virtually parallel for small movements.

The punch supports carry bearings 29 for the associated control shafts.

In the embodiment of FIG. 2, each punch (1*a*, 2*i*) is mounted at the lower end of a shank 30 guided by common guide pieces 31, 32, 33, and subjected to the action of a restoring spring 34.

The drivers 19*a* to 19*i* and 20*a* to 20*i* are narrow transversely to the tape direction, but relatively long in the tape direction, so that an adequately large surface of contact with the punch support and with the punching block is ensured. They are fabricated from a light material, preferably a plastics material with good shock-deadening properties.

In known tape perforators which exhibit only one row of punches (i.e., one punch for each hole track) punching is effected, as has already been mentioned, one hole combination at a time. The control instructions for the selection of the hole combination informations arrive one after another and the punching of a hole combination takes place after the arrival of the control instructions each time. In contradistinction hereto, in the perforator according to the invention the punching is initiated only when the control instructions for the two rows of hole combinations have caused the selection in both rows. Since these control instructions normally arrive consecutively, it is desirable each time for the first of two consecutive control instructions to be stored for a sufficient time until the second arrives, whereupon the selecting means (the drivers in the embodiments illustrated) are simultaneously actuated.

For this purpose, in the embodiments shown, the control instructions for the perforation of the first row of holes are fed to the electromagnets EM 23*a* to EM 23*i*, and the control instructions for the perforation of the other row of holes to the control magnets EM 24*a* to EM 24*i*. The armatures of these control magnets, to which the drivers 19*a* to 19*i* and 20*a* to 20*i* are secured via the flexible shafts 21*a* to 21*i* and 22*a* to 22*i*, can be moved only when the punching block 7 occupies the top position. But the punching block 7, being driven by the continuously revolving shaft 17 and the eccentric 16 secured thereto, moves continuously up-and-down and it is therefore necessary for the control instructions to reach the control magnets EM 23 and EM 24 at the correct moment of time with respect to the rotation of the shaft 17 (i.e., when the punching block 7 is at the top and the drivers are able to move freely). For this reason it is advantageous to store not only the first, but also the next control instructions and to pass them to the electromagnets EM 23*a* to EM 23*i* and EM 24*a* to EM 24*i* at the appropriate part of each revolution of the shaft 17.

It is therefore desirable to provide for operating the perforator a circuit which permits the storage and properly synchronised feeding to the electromagnets of the control instructions for two hole combinations. A possible example of such a circuit is illustrated in FIG. 3 and will be explained hereinbelow.

The hole combination information which is required to be punched—i.e., the control instructions for the eight hole tracks in the embodiments illustrated are fed to the inputs 50*a* to 50*d* and 50*f* to 50*i*. The control pulses for the punching of the transport hole tracks, which act simultaneously as instructions for the acceptance of the information control pulses, are fed to the conductor 50*e*. All these control instructions are in the first instance stored in the shift register stages 60*a* to 60*e* and can pass from there, by the action of shift pulses in known manner, to the second group of shift register stages 61*e* to 61*i*. From the outputs of the first group of shift register stages 60*a* to 60*i*, the control instructions pass via the AND-gates 62*a* to 62*i* and the stores 64*a* to 64*i* to the electromagnets EM 24*a* to EM 24*i*, which control the punches of row II via their armatures 24*a* to 24*i* and the driver bodies 20*a* to 20*i* (FIG. 2).

From the outputs of the second group of shift register stages 61*a* to 61*i*, the control instructions pass via the AND-gates to 63*i* and the stores 65*a* to 65*i* to the electromagnets EM 23*a* to EM 23*i*, which control the punches of the row I via the armatures 23*a* to 23*i* and the driver bodies 20*a* to 20*i* (FIG. 2).

The following is an example of the sequence of a punching operation:

It will be assumed that all the stores 60, 61, 64 and 65 are "empty" (i.e., contain the information "0"). At a specific point in time, the control instructions constituting the first information-bearing signal for punching a hole combination reach the inputs 50*a* to 50*i*. The control instruction for the transport perforation (50*e*) passes to the delay circuit 68 which, after a specific time, delivers a shift pulse 71 to the shift register stages 60*a* to 60*i* and 61*a* to 61*i*. This causes the control instructions 50*a* to 50*i* to be stored in the shift register stages 60*a* to 60*i*. Due to the shift pulse 71, the shift register stages 61*a* to 61*i* receive the information which was previously in the shift register stages 60*a* to 60*i*, and therefore all remain at "zero." The AND-gate 66, which becomes conductive only when the shift register stage 60*e* and 61*e* are set to "One," still remains cut-off, and no control instructions are able to pass to the electromagnets (consequently no punching will occur).

The delay circuit 68 has the function to ensure that all the control instructions are present at 50*a* to 50*i* at the moment of delivery of the shift pulse 71, and are thus correctly stored in the shift register stages 60*a* to 60*e*.

The delay circuit 68 may be a monostable multivibrator of known type as likewise the delay circuits 69 and 70. The shift register stages 60*a* to 60*i* and 61*a* to 61*i*, and the storage stages 64*a* to 64*i* and 65*a* to 65*i* may be flip-flop circuits of known type, constituting the second information bearing signal.

At a later point in time, the control instructions signal for punching the second hole combination arrive at the inputs 50*a* to 50*i*. Due to the freshly generated shift pulse 71, these fresh control instructions are stored in the shift register stages 60*a* to 60*i*, the control instructions for the first hole combination previously stored therein being stored at the same time in the shift register stages 61*a* to 61*i*. Since a "one" is now stored in each of the shift register stages 60*e* and 61*e* (a control instruction for perforating the transport hole occurs at 50*e* for each hole combination), the AND-gate is now conductive. The control instructions which are stored in the shift register stages 60*a* to 60*i* are now able to pass via the gates 62*a* to 62*i* to the stores 64*a* to 64*i* and thus also to the electromagnets EM 24*a* to EM 24*i*, and likewise the control instructions which are stored in the shift stages 61*a* to 61*i* are now able to pass via the gates 63*a* to 63*i* to the stores 65*a* to 65*i* and thus also to the electromagnets EM 23*a* to EM 23*i*, namely when the AND-gates 62*a* to 62*i* and 63*a* to 63*i* have been rendered conductive by the "machine rhythm" 74 generated by a cam contact 75 controlled by a cam 76 on the shaft 17 and thus possesses a fixed phase relationship to the reciprocating vertical movement of the punching block 7, since both the punching block and the cam contact are controlled by the shaft 17.

The circuit of FIG. 3 thus permits the simultaneous punching of two hole combinations (punch rows I and II) in a single descent of the punching block 7.

A short time after the punching, the "erase" pulse 72 is generated via the AND-gate 67 and the delay circuit 63, and sets the shift register stages 60*a* to 60*i* and 61*a* to 61*i* to zero, thus preparing them to receive fresh control instructions. Also a short time after the perforation, the pulse 73 is generated via the AND-gate 67 and delay circuit 70, and, on the one hand, sets the stores 64*a* and 55*a* to 55*i* to zero, and on the other hand, via the conductor 103, trips the paper feed T by two hole divisions *t* (FIGS. 1, 2).

It will be appreciated that various modification may be made to the embodiments illustrated. For instance, the drive of the punching block may also be effected by means of a crank drive. The straight guiding of the punching block may be achieved by a laterally stable suspension by means of leaf springs without additional guide bars or the like. Furthermore the invention is not restricted to the form of construction of the control system of the punches by the electromagnets EM 23*a* to EM 23*i* and EM 24*a* to EM 24*i* as illustrated. Also, the perforator may be made in such a way that the punches, control magnets and punching block with eccentric shaft are located beneath the punching die 3.

What is claimed is:

1. A perforator for tapes, punch cards and the like comprising first and second rows of punches, said rows being spaced apart by a predetermined distance and being disposed transversely to the direction of travel of a tape and the like through the perforator, input means for receiving information-bearing signals, selection means for selecting for actuation a combination of the punches in the said first and second rows in response to first and second information-bearing signals respectively received by said input means, said selection means comprising a driver for each of said punches in each of said rows, each driver comprising a generally flat rectangular member having a first lateral edge and a second lateral edge opposed to said first lateral edge, each of said drivers having an operative position in which said lateral edges lie in a vertical plane and an inoperative position in which said lateral edges lie in a plane making an acute angle to the vertical, means for mounting each of said drivers about a longitudinal axis thereof, means for moving the drivers about said longitudinal axis from said inoperative position to said operative position in response to said information-bearing signals, means for simultaneously actuating the selected punches in both of said rows, said actuating means comprising a common actuator defining a recessed surface, said first lateral edge of said drivers co-operating when said drivers are in their operative positions with said surface upon actuation of said common actuator and co-operating when said drivers are in their inoperative positions with said recesses, upon actuation of said common actuator, said second lateral edges of said drivers co-operating when said drivers are in their operative positions with said punches to cause a hole to be punched, and means for advancing to said punches a length of tape and the like equal to twice said predetermined distance.

2. The perforator of claim 1 in which said mounting means includes rotatable shafts, one for each driver, electromagnetic devices each operably connected to a different one of said rotatable shafts for rotation thereof in response to the receipt of said information-bearing signals.

3. The perforator of claim 1 in which said drivers are fabricated from a shock-deadening plastics material.

4. The perforator of claim 2 in which said rotatable shafts are flexible.

5. The perforator of claim 2 in which said rotatable shafts are flexible and are disposed parallel to the direction of travel of a tape and the like.

6. A perforator for tapes, punch cards and the like comprising first and second rows of punches, said rows being spaced apart by a predetermined distance and being disposed transversely to the direction of travel of a tape and the like through the perforator, input means for receiving information-bearing signals, selection means for selecting for actuation a combination of the punches in the said first and second rows in response to first and second information-bearing signals respectively received by said input means, said selection means comprising a driver for each of said punches in each of said rows, each driver comprising a generally flat rectangular member having a first lateral edge and a second lateral edge opposed to said first lateral edge, each of said drivers having an operative position in which said lateral edges lie in a vertical plane and an inoperative position in which said lateral edges lie in a plane making an acute angle to the vertical, means mounting each of said drivers about a longitudinal axis thereof, means for moving the drivers about said longitudinal axis from said inoperative position to said operative position in response to said information-bearing signals, means for simultaneously actuating the selected punches in both of said rows, said actuating means comprising a common actuator, means reciprocating said actuator between an actuating and a non-actuating position, a cam-follower carried by said actuator, a cam bearing against said cam follower, means for rotating said cam to cause said actuator to reciprocate, said actuator defining a recessed surface, said first lateral edge of said drivers co-operating when said drivers are in their operative positions with said surface upon actuation of said common actuator and co-operating when said drivers are in their inoperative positions with said recesses upon actuation of said actuator, said second lateral edges of said drivers co-operating when said drivers are in their operative positions with said punches to cause a hole to be punched, and means for advancing to said punches a length of tape and the like equal to twice said predetermined distance.

7. A perforator for tapes, punch cards and the like comprising first and second rows of punches, said rows being spaced apart by a predetermined distance and being disposed transversely to the direction of travel of a tape and the like through the perforator, mountings for said punches, each mounting comprising a resilient tongue which in the unstressed state is orientated substantially parallel to the tape travel past the punches, input means for receiving information-bearing signals, selection means for selecting for actuation a combination of the punches in the said first and second rows in response to first and second information-bearing signals respectively received by said input means, said selection means comprising a driver for each of said punches in each of said rows, each driver comprising a generally flat rectangular member having a first lateral edge and a second lateral edge opposed to said first lateral edge, each of said drivers having an operative position in which said lateral edges lie in a vertical plane and an inoperative position in which said lateral edges lie in a plane making an acute angle to the vertical, means mounting each of said drivers about a longitudinal axis thereof, said mounting means including rotatable shafts, one for each driver, electromagnetic devices each operably connected to a different one of said rotatable shafts for rotation thereof in response to the receipt of said information-bearing signals, said rotatable shafts being flexible and disposed parallel to the direction of travel of a tape and the like, means for simultaneously actuating the selected punches in both of said rows, said actuating means comprising a common actuator means reciprocating said actuator between an actuating and a non-actuating position, a cam-follower carried by said actuator, a cam bearing against said cam follower, means for rotating said cam to cause said actuator to reciprocate, said actuator defining a recessed surface, said first lateral edge of said drivers co-operating when said drivers are in their operative positions with said surface upon actuation of said common actuator and co-operating when said drivers are in their inoperative positions with said recesses upon actuation of said actuator, said second lateral edges of said drivers co-operating when said drivers are in their operative positions with said punches to cause a hole to be punched, and means for advancing to said punches a length of tape and the like equal to twice said predetermined distance.

8. A perforator for tapes, punch cards and the like comprising first and second rows of punches, said rows being spaced apart by a predetermined distance and being disposed transversely to the direction of travel of a tape and the like through the perforator, mountings for said punches, each mounting comprising a shank, a restoring spring connected to said shank and a guide for said shank, input means for receiving information-bearing signals, selection means for selecting for actuation a combination of the punches in the said first and second rows in response to first and second information-bearing signals respectively received by said input means, said selection means comprising a driver for each of said punches in each of said rows, each driver comprising a generally flat rectangular member having a first lateral edge and a second lateral edge opposed to said first lateral edge, each of said drivers having an operative position in which said lateral edges lie in a vertical plane and an inoperative position in which said lateral edges lie in a plane making an acute angle to the vertical, means mounting each of said drivers about a longitudinal axis thereof, said mounting means including rotatable shafts, one for each driver, electromagnetic devices each operably connected to a different one of said rotatable shafts for rotation thereof in response to the receipt of said information-bearing signals, said rotatable shafts being flexible and disposed parallel to the direction of travel of a tape and the like, means for simultaneously actuating the selected punches in both of said rows, said actuating means comprising a common actuator means reciprocating said actuator between an actuating and a non-actuating position, a cam follower carried by said actuator, a cam bearing against said cam follower, means for rotating said cam to cause said actuator to reciprocate, said actuator defining a recessed surface, said first lateral edge of said drivers co-operating when said drivers are in their operative positions with said surface upon actuation of said common actuator and co-operating when said drivers are in their inoperative positions with said recesses upon actuation of said actuator, said second lateral edges of said drivers co-operating when said drivers are in their operative positions with said punches to cause a hole to be punched, and means for advancing to said punches a length of tape and the like equal to twice said predetermined distance.

References Cited by the Examiner

UNITED STATES PATENTS

| | | | |
|---|---|---|---|
| 775,237 | 11/1904 | Collins | 234—115 |
| 903,963 | 11/1908 | Farley | 234—119 |
| 1,016,862 | 2/1912 | White | 234—119 |
| 3,038,654 | 6/1962 | Steiner | 234—115 |
| 3,101,172 | 8/1963 | Mayer et al. | 234—42 |
| 3,122,311 | 2/1964 | Masterson | 234—119 |
| 3,123,290 | 3/1964 | Rabinow et al. | 234—115 |

WILLIAM S. LAWSON, *Primary Examiner.*